(12) United States Patent
Hao et al.

(10) Patent No.: US 7,941,742 B1
(45) Date of Patent: May 10, 2011

(54) VISUALIZING GROWING TIME SERIES DATA IN A SINGLE VIEW

(75) Inventors: Ming C. Hao, Palo Alto, CA (US);
Umeshwar Dayal, Saratoga, CA (US);
Chantal Tremblay, Notre-Dame-De-La-Merci (CA);
Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 987 days.

(21) Appl. No.: 11/796,840

(22) Filed: Apr. 30, 2007

(51) Int. Cl.
*G06F 17/00* (2006.01)
*G09G 5/00* (2006.01)
*G09G 5/02* (2006.01)

(52) U.S. Cl. ........ 715/215; 715/212; 715/273; 345/418; 345/581; 345/589

(58) Field of Classification Search .................. 715/212, 715/215, 273; 345/55, 418, 581, 589
See application file for complete search history.

(56) References Cited

U.S. PATENT DOCUMENTS

| | | | |
|---|---|---|---|
| 3,487,308 A | 12/1969 | Johnson | |
| 5,581,797 A | 12/1996 | Baker et al. | |
| 5,588,117 A | 12/1996 | Karp et al. | |
| 5,608,904 A | 3/1997 | Chaudhuri et al. | |
| 5,623,590 A | 4/1997 | Becker et al. | |
| 5,623,598 A | 4/1997 | Voigt et al. | |
| 5,634,133 A | 5/1997 | Kelley | |
| 5,659,768 A | 8/1997 | Forbes et al. | |
| 5,694,591 A | 12/1997 | Du et al. | |
| 5,742,778 A | 4/1998 | Hao et al. | |
| 5,757,356 A | 5/1998 | Takasaki et al. | |
| 5,801,688 A | 9/1998 | Mead et al. | |
| 5,828,866 A | 10/1998 | Hao et al. | |
| 5,844,553 A | 12/1998 | Hao et al. | |
| 5,878,206 A | 3/1999 | Chen et al. | |
| 5,903,891 A | 5/1999 | Chen et al. | |
| 5,924,103 A | 7/1999 | Ahmed et al. | |
| 5,929,863 A | 7/1999 | Tabei et al. | |
| 5,940,839 A | 8/1999 | Chen et al. | |

(Continued)

FOREIGN PATENT DOCUMENTS

EP 0778001 11/1996

OTHER PUBLICATIONS

M.C. Hao et al., U.S. Appl. No. 11/700,429, entitled "Providing an Automated Visualization of a Collection of Data Values Divided Into a Number of Bins Depending Upon a Change Feature of the Data Values," filed Jan. 31, 2007, pp. 1-19, Figs. 1A-5.

(Continued)

*Primary Examiner* — Chau Nguyen

(57) ABSTRACT

To visualize growing time series data, first data values of a time series are presented for display in a single view, where the data values are for display in cells according to a first density in the view. Additional data values of the time series are received, and a density of the view is modified in response to receiving the additional data values. The first data values and additional data values are presented for display in cells arranged according to the modified density in the view.

19 Claims, 7 Drawing Sheets
(5 of 7 Drawing Sheet(s) Filed in Color)

U.S. PATENT DOCUMENTS

| Patent Number | | Date | Inventor |
|---|---|---|---|
| 5,986,673 | A | 11/1999 | Martz |
| 5,999,193 | A | 12/1999 | Conley, Jr. et al. |
| 6,052,890 | A | 4/2000 | Malagrino, Jr. et al. |
| 6,115,027 | A | 9/2000 | Hao et al. |
| 6,144,379 | A | 11/2000 | Bertram et al. |
| 6,211,880 | B1 | 4/2001 | Impink, Jr. |
| 6,211,887 | B1 | 4/2001 | Meier et al. |
| 6,269,325 | B1 | 7/2001 | Lee et al. |
| 6,314,453 | B1 | 11/2001 | Hao et al. |
| 6,377,287 | B1 | 4/2002 | Hao et al. |
| 6,400,366 | B1 | 6/2002 | Davies et al. |
| 6,584,433 | B1 | 6/2002 | Zhang et al. |
| 6,429,868 | B1 | 8/2002 | Dehner, Jr. et al. |
| 6,603,477 | B1 | 8/2002 | Tittle |
| 6,466,946 | B1 | 10/2002 | Mishra et al. |
| 6,466,948 | B1 | 10/2002 | Mishra et al. |
| 6,502,091 | B1 | 12/2002 | Chundi et al. |
| 6,590,577 | B1 | 7/2003 | Yonts |
| 6,658,358 | B2 | 12/2003 | Hao et al. |
| 6,684,206 | B2 | 1/2004 | Chen et al. |
| 6,727,926 | B1 | 4/2004 | Utsuki et al. |
| 6,934,578 | B2 | 8/2005 | Ramseth |
| 6,937,238 | B2 | 8/2005 | Hao et al. |
| 7,020,869 | B2 | 3/2006 | Abari et al. |
| 7,046,247 | B2 | 5/2006 | Hao et al. |
| 7,202,868 | B2 | 4/2007 | Hao et al. |
| 7,221,474 | B2 | 5/2007 | Hao et al. |
| 7,313,533 | B2 | 12/2007 | Chang et al. |
| 7,567,250 | B2 | 7/2009 | Hao et al. |
| 7,714,876 | B1 | 5/2010 | Hao et al. |
| 2002/0118193 | A1 | 8/2002 | Halstead, Jr. |
| 2002/0171646 | A1 | 11/2002 | Kandogan |
| 2003/0065546 | A1 | 4/2003 | Gorur et al. |
| 2003/0071815 | A1 | 4/2003 | Hao et al. |
| 2003/0208323 | A1 | 11/2003 | Hao et al. |
| 2003/0214504 | A1 | 11/2003 | Hao et al. |
| 2003/0218630 | A1* | 11/2003 | Rutledge et al. ............. 345/738 |
| 2003/0221005 | A1 | 11/2003 | Betge-Brezetz et al. |
| 2004/0004617 | A1* | 1/2004 | Street et al. .................. 345/440 |
| 2004/0051721 | A1 | 3/2004 | Ramseth |
| 2004/0054294 | A1 | 3/2004 | Ramseth |
| 2004/0054295 | A1 | 3/2004 | Ramseth |
| 2004/0168115 | A1 | 8/2004 | Bauernschmidt et al. |
| 2004/0183799 | A1 | 9/2004 | Hao et al. |
| 2004/0186803 | A1* | 9/2004 | Weber et al. .................... 705/35 |
| 2004/0205450 | A1 | 10/2004 | Hao et al. |
| 2004/0210540 | A1 | 10/2004 | Israel et al. |
| 2004/0252128 | A1 | 12/2004 | Hao et al. |
| 2005/0060300 | A1* | 3/2005 | Stolte et al. ...................... 707/3 |
| 2005/0066026 | A1 | 3/2005 | Chen et al. |
| 2005/0088441 | A1 | 4/2005 | Hao et al. |
| 2005/0119932 | A1 | 6/2005 | Hao et al. |
| 2005/0177598 | A1 | 8/2005 | Hao et al. |
| 2005/0219262 | A1 | 10/2005 | Hao et al. |
| 2006/0059439 | A1 | 3/2006 | Hao et al. |
| 2006/0095858 | A1 | 5/2006 | Hao et al. |
| 2006/0164418 | A1 | 7/2006 | Hao et al. |
| 2007/0225986 | A1 | 9/2007 | Bowe et al. |
| 2008/0082578 | A1* | 4/2008 | Hogue et al. ............... 707/104.1 |
| 2009/0033664 | A1 | 2/2009 | Hao et al. |

OTHER PUBLICATIONS

M.C. Chuah et al., "Dynamic Aggregation with Circular Visual Designs," School of Computer Science, Carnegie Mellon University, pp. 1-9 (1998).

M. Ankerst et al., "Towards an Effective Cooperation of the User and the Computer for Classifcation ," Institute for Computer Science, University of Munich, pp. 1-10 (2000).

D A. Kein et al., "Hierarchical Pixel Bar Charts" IEEE Transactions on Visualization and Computer Graphics, vol. 8, No. 3, pp. 255-269 ( Jul.-Sep. 2002).

D A. Kein et al, "Designing Pixel-Oriented Visualization Techniques: Theory and Applications," IEEE Transactions on Visualization and Computer Graphics, vol. 6, No. 1, pp. 59-78 (Jan.-Mar. 2000).

J.V. Carlis et al., "Interactive Visualization of Serial Periodic Data," Proceedings of UIST '98, 11th Annual Symposium on User Interface Software and Techology, pp. 1-10, (Nov. 1998).

S.G. Eick et al., "Visual Scalability," Technical Report No. 106, National Institute of Statistical Sciences, pp. 1-27 (Jun. 2000).

G.W. Furnas, "Generalized Fisheye Views," Human Factors in Computing Systems CHI '86 Conference Proceedings, pp. 16-23 (1986).

D. Kein, "Pixel Bar Charts: A New Technique for Visualizing Large Multi-Attribute Data Sets without Aggregation," pp. 1-10 (2001).

M.C. Hao et al., "Visual Mining of E-Customer Behavior Using Pixel Bar Charts," Hewlett-Packard Research Laboratories, pp. 1-7 (2001).

D.A. Kein et al., "Recursive Pattern: A Technique for Visualizing Very Large Amounts of Data," Proceedings of the 6th IEEE Visualization Conference, pp. 279-286, (1995).

A. Aris et al., "Representing Unevenly-Spaced Time Series Data for Visualization and Interactive Exploration," pp. 1-12 (2005).

M. Weber et al., "Visualizing Time-Series on Spirals," pp. 1-6 (2001).

L. Wei et al., "Assumption-Free Anomaly Detection in Time Series," University of California—Riverside, Department of Computer Science & Engineering, pp. 1-4 (2005).

R. Rao et al., http://sigchi.org/chi95/proceedings/videos/rr_bdy.htm, (at least as early as Jan. 12, 2007).

Deun et al., Multidimensional Scaling, Open and Distance Learning, Jan. 12, 2000 (pp. 1-16).

http://www.pavis.org/essay/multidimensional_scaling.html, 2001 Wojciech Basalaj, (pp. 1-30).

D. Keim et all., Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. On Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

D. Keim et al "Hierarchical Pixel Bar Charts", IEEE Transactions on Visualization and Computer Graphics, vol. 8, No. 3, Jul.-Sep. 2002, pp. 255-269.

Daniel Keim et al "Designing Pixel-Orientated Visualization Techniques: Theory and Applications" IEEE Transactions on Visualization and Computer Graphics, vol. 6, No. 1, Jan-Mar 2000, pp. 59-78.

U.S. Appl. No. 11/523,240 entitled "Time Relevance-Based Visualization of Data" filed on Sep. 19, 2006, pp. 1-22.

* cited by examiner

VISUALIZING GROWING TIME SERIES DATA IN A SINGLE VIEW

BACKGROUND

In many applications, data can be provided in a time series (data streams), in which data values are provided in a series of time points. Example applications in which data can be expressed in time series include financial applications (e.g., time series of asset prices, revenue, profit, currency exchange rates, etc.), network monitoring (e.g., metrics regarding performance of various aspects of a network, performance metrics of servers, performance metrics of routers, etc.), and so forth.

Customer and database administrators (or other users) often have to digest and visualize long multi-dimensional time series data, such as data reflecting workload management, network performance, computer performance, database loading error rates, and so forth. The time series data is analyzed to discover patterns, trends, and anomalies.

Although various types of charts can be used to visualize time series data, conventional visualization techniques often are unable to adequately display a sufficiently large number of time intervals for long, multi-dimensional time series, particularly when the time series is continually growing. As a result, users are unable to effectively analyze or visualize data patterns, trends, and anomalies in a single view.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are described with respect to the following figures.

DETAILED DESCRIPTION

Figure 1:
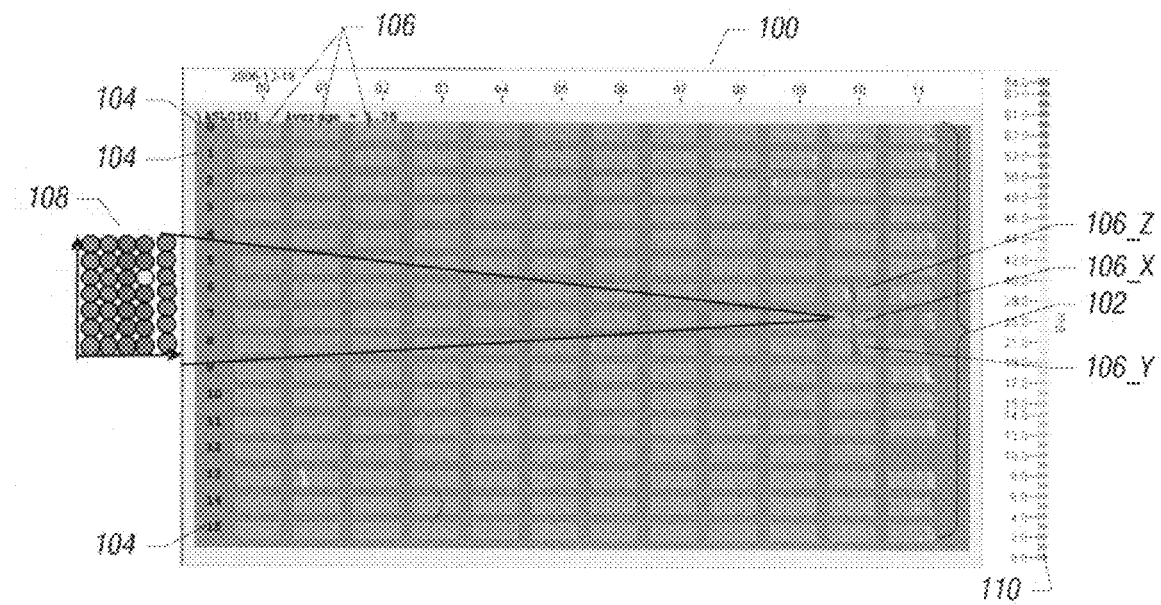
FIGS. 1 and 2 illustrate different cell-based display regions for visualizing growing time series, in accordance with an embodiment.

FIG. 1 shows a display region 100 (which is displayable in a display device) for visualizing multiple time series. Each time series refers to a collection or set of data values over time. The display region 100 can be in the form of a graphical user interface (GUI) screen, which can be a GUI window (such as a window provided by various operating systems, including WINDOWS® operating systems, UNIX operating systems, LINUX operating systems, etc.), or other image. The display screen 100 (also referred to as the "visualization screen") depicts a main array 102 of cells for multiple time series. The display screen 100 thus provides a "view" of the multiple time series, where a "view" refers to a graphical representation of the time series.

In the example depicted in FIG. 1, 16 rows 104 are provided in the main array 102, where each row 104 corresponds to a respective time series of data values. In the example of FIG. 1, the 16 time series correspond to 16 different central processing units (CPUs) 0-15. The data values being depicted in the example display screen 100 of FIG. 1 correspond to a CPU busy percentage attribute, which represents the percentage of time that the corresponding CPU is busy. The CPU busy percentage value is one example of a measurement attribute to be represented in the display screen 100.

In the main array 102, each row 104 includes an arrangement of cells that represent data values (of corresponding data records) of the measured attribute (in this case, CPU busy percentage) over time. Each cell represents a corresponding data record. In the example of FIG. 1, 12 time intervals are depicted, where each time interval corresponds to an hour. Thus, each row presents data values for 12 hourly time intervals, starting at the $0^{th}$ hour and ending in the $11^{th}$ hour on a particular date. Within each row, each time interval is associated with a respective block 106 of cells. Thus, in the first row 104 corresponding to CPU 0, 12 blocks 106 are depicted for the 12 hourly intervals. Each block 106 has a sub-array of cells, such as sub-array 108 for block 106_X depicted in FIG. 1. The sub-array 108 of cells includes multiple rows and columns of cells that represent data values for each sub-time interval, in this example, minute time intervals. The cells are assigned different colors to represent different data values. In other implementations, other visual indicators can be employed.

In some embodiments, as a pointer (e.g., mouse pointer) is moved over each cell, then the content of the data record represented by that cell is displayed. Thus, a user can move the pointer to different cells to display contents of the respective data records.

The sub-array 108 includes 60 cells for the hourly time interval represented by block 106_X (note that less than 60 cells are actually depicted in FIG. 1 for clarity). The sub-time intervals within each block are also referred to as "measurement intervals," since the data value for each sub-time interval can be a data value measured by some monitoring device that takes measurements at periodic sub-time intervals. In this scenario, each cell of a block thus represents a respective measurement value taken at the corresponding sub-interval.

More generally, the visualization of data values of time series provided by some embodiments includes a view having a main array of blocks, where each block includes a sub-array of cells. A block corresponds to the main time interval for the main array 102, whereas each cell corresponds to a sub-interval that is part of the main time interval. Each row of the main array 102 represents a corresponding time series, with the multiple rows corresponding to different time series. Each column of the main array 102 represents a main time interval. In a different embodiment, instead of representing time in columns, time can be represented in rows, and each time series can proceed along a column.

A feature of the view according to some embodiments is that scrolling is not used along a time axis of the view (which in the FIG. 1 example is the horizontal axis). Therefore, as depicted in FIG. 1, a scroll bar in the time axis is not employed along the time axis. The time series data can thus be depicted in a single view (which is a view that does not use scrolling along the time axis). Displaying time series data in a single view makes it more convenient for the user to perform a visual analysis of the time series data, including a comparison of multiple time series.

As further depicted in FIG. 1, a scale 110 is provided to map different colors to different data values of the measured attribute being depicted in the display screen 100. In the example of FIG. 1, green corresponds to lower data values of the measurement attribute, whereas red corresponds to higher data values. Colors between green and red correspond to intermediate data values.

In the example of FIG. 1, for a system that includes 16 CPUs (CPUs 0-15), a user can easily view the target attribute (in this case, CPU busy percentage) over multiple time intervals for the multiple CPUs. The color coding allows the user to easily notice portions of concern, in this case, block portions with red cells, such as those in block 106_X, block 106_Y, and block 106_Z.

Figure 2:
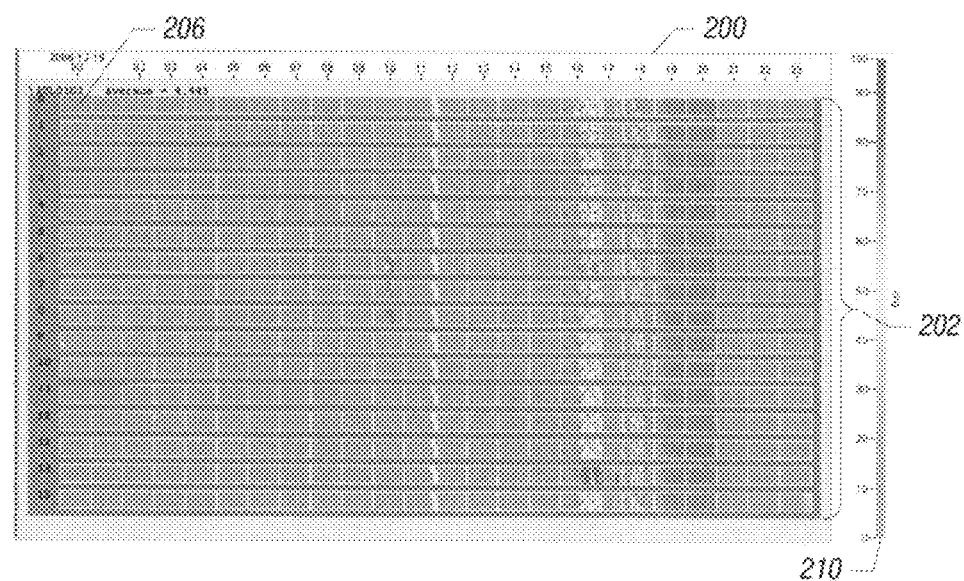

It is noted that the measured attribute (in this case, CPU busy percentage) is an attribute that is measured in real-time, such as by sensors associated with the various CPUs of the system. As such, the data values for the target measurement attribute are continually received by the visualization system according to some embodiments. The newly received data values cause the time series to grow since additional data values are being added to the time series. A time series is considered to be "growing" when newly received data values are added to the time series. As additional data values are received, such additional data values can be effectively displayed in the single view by increasing the density of cells to form display region 200 depicted in FIG. 2. In some embodiments, the size of the overall display region 200, and in particular, the size of the main array 202 (FIG. 2), remains the same as the respective display region 100 and main array 102 of FIG. 1, even though additional data values are being presented in additional cells. This is accomplished by reducing the size of the blocks of cells corresponding to main time intervals, as depicted in FIG. 2. In FIG. 2, it is noted that the time intervals have increased from 12 time intervals to 24 time intervals (from the $0^{th}$ hour to the $23^{rd}$ hour), while the size of the display region 200 remains the same. Effectively, as additional data is received (which can be in real-time), the density of the single view is changed to accommodate the display of the existing data and the additional data in the single view.

Since the main time intervals are still hourly intervals, each block 206 in the display region 200 of FIG. 2 contains the same number of cells as a block 106 in FIG. 1. However, the block 206 in FIG. 2 is made smaller than the block 106 of FIG. 1 so that the blocks for the 24 hourly intervals can fit within the display region 200. The main array 202 of FIG. 2 has 16 rows and 24 columns of blocks 206, while the main array 102 of FIG. 1 has 16 rows, but just 12 columns. Effectively, the density of cells in the main array 202 of FIG. 2 is greater than the density of cells in the main array 102 of FIG. 1. Because the cells are assigned colors to correspond to data values of respective cells, a user is still able to easily identify regions of interest, such as regions that contain clusters of red color cells, even with increased density of cells.

A scale 210 in the display region 200 of FIG. 2 is updated with respect to the scale 110 of FIG. 1 to reflect a larger range of data values depicted in the display region 200.

Effectively, a visualization technique according to some embodiments allows for varying density visualization of one or more time series that are growing (data values of the one or more time series are continually being received and added to the time series) in a single view. The ability to provide denser visualization of data values as additional data values are received is especially useful in a real-time monitoring context, where measurement data can be continually received from a system being monitored. Note that although the example of FIGS. 1 and 2 provide visualization of multiple time series, it is noted that the varying density technique according to some embodiments can be applied to a single time series.

Also, although reference is made to visualizing measurement data for CPUs of a system, it is noted that measurement data for other systems can also be visualized using techniques according to some embodiments. Examples of other types of measurement data include data relating to performance of software, business data (e.g., revenue, profit, cost, etc.), customer support data (e.g., call log data, data relating to customer complaints, etc.), and other data.

Figure 3:
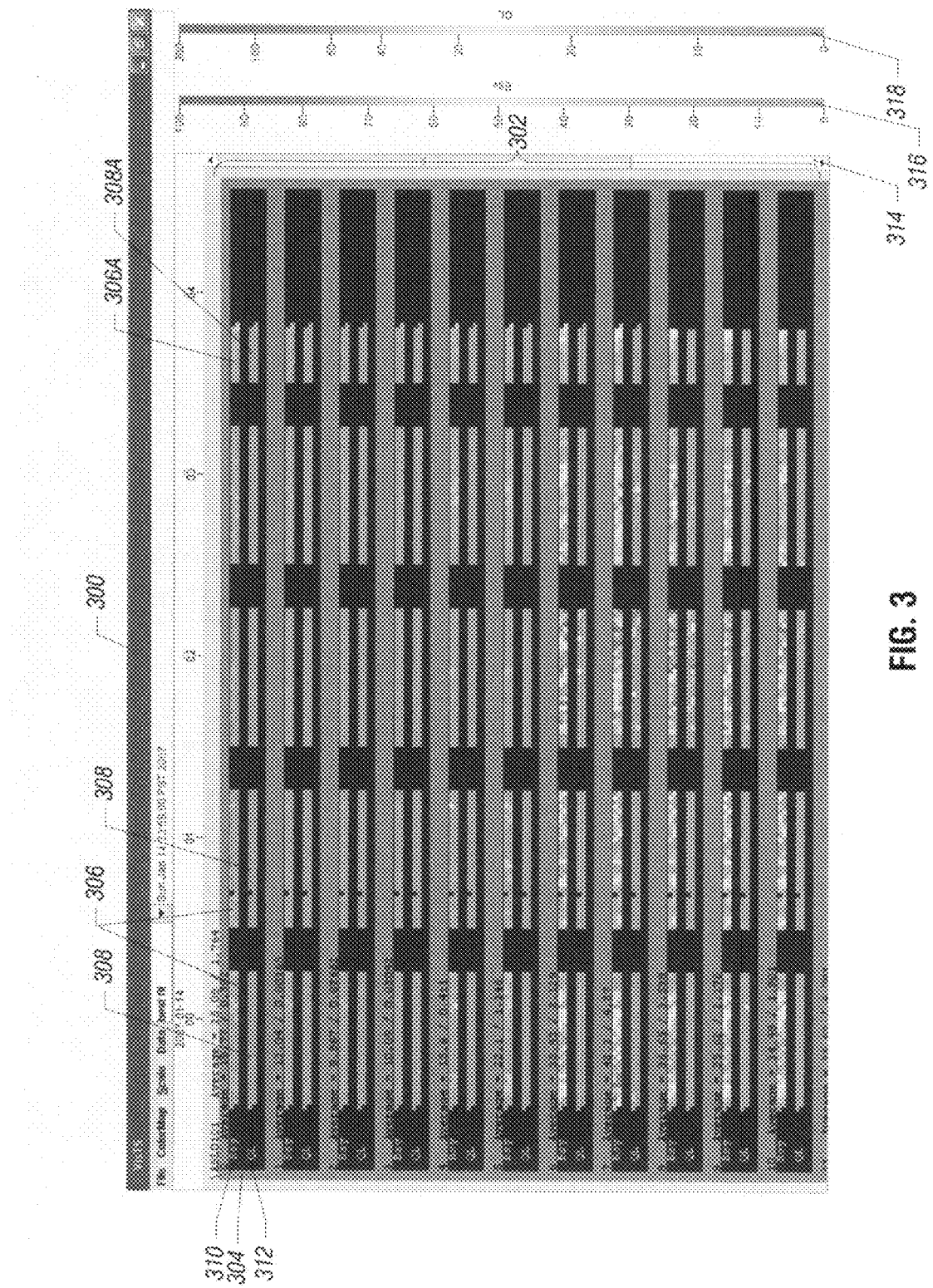
FIGS. 3-6 illustrate other visualization display regions according to visualization techniques of some embodiments.
Figure 4:
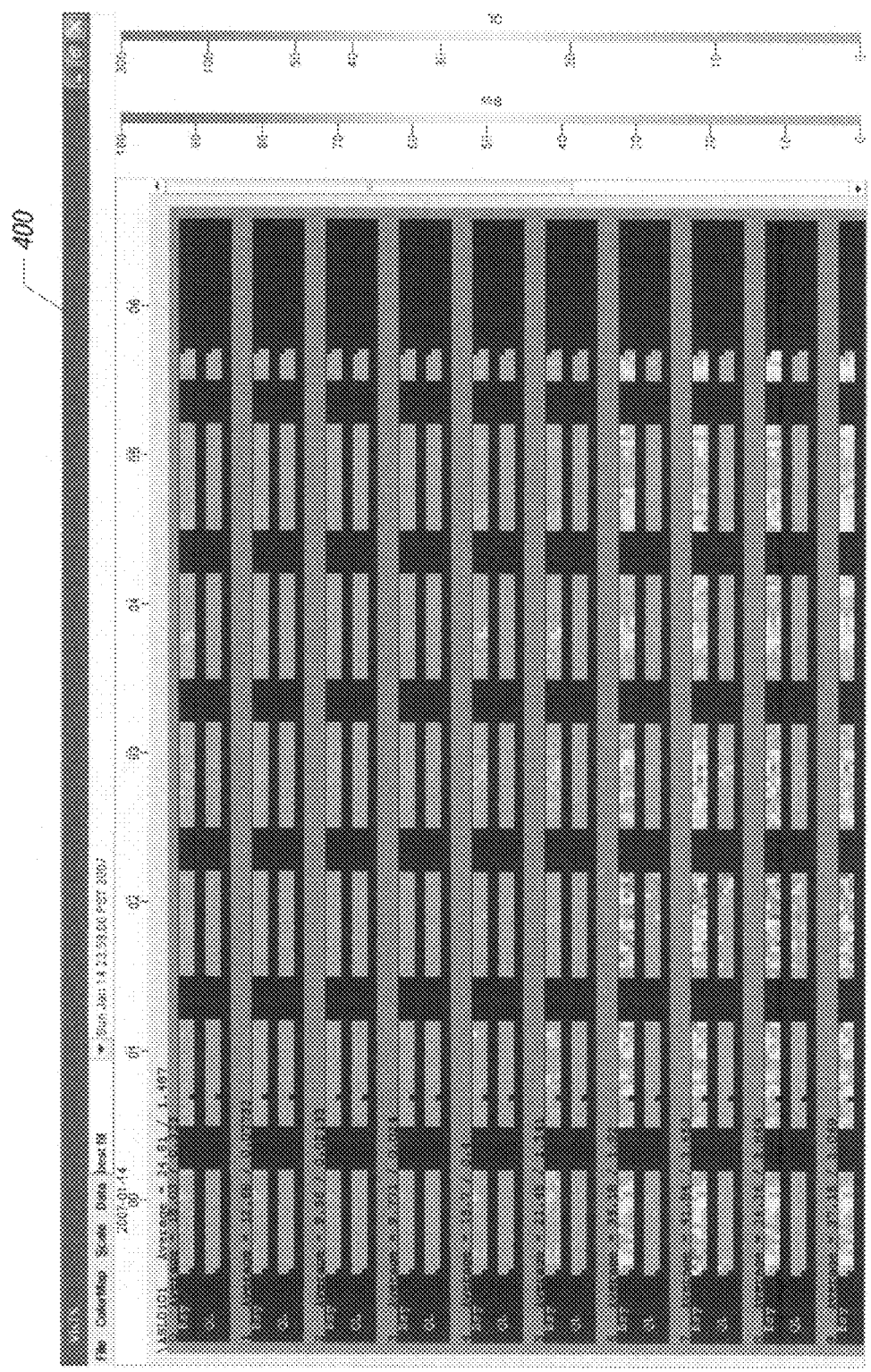

FIGS. 3 and 4 illustrate another example of the varying density visualization technique according to some embodiments. FIG. 3 shows a first display region 300 that depicts data values of attributes for 11 time series (corresponding to CPUs 0-10) in an array 302. Each row 304 of the array 302 depicted in the display region 300 has blocks 306, 308 of cells for the data values for two different attributes (CPU busy percentage or "Bsy," and queue length or "QL"). Each row 304 basically has two sub-rows, where each sub-row corresponds to data values of a respective one of the two different attributes Bsy and QL. Within each row 304, a first sub-row includes blocks 306 along the horizontal dimension of the array 302, and a second sub-row includes blocks 308 along the horizontal dimension of the array 302.

Because not all the time series for all 16 CPUs being monitored can fit within the display region 300, a scroll bar 314 is provided to allow a user to scroll to the visualization of time series for other CPUs. Two scales 316 and 318 are provided to map data values to respective colors for the two different attributes (Bsy and QL).

FIG. 3 shows visualization of the two attributes (Bsy and QL) for the various different CPUs collected as of a certain time, such as 04:20 a.m. The blocks 306, 308 in the display region 300 for the first four time intervals (time interval 00, 01, 02, 03) are full blocks to reflect the fact that data values have been collected for all measurement intervals (sub-time intervals) within the respective blocks. However, since the collection process has proceeded only part of the way through time interval 04, the respective blocks 306A, 308A in time interval 04 are partial blocks reflecting the fact that not all data values for the measurement intervals of main time interval 04 have been collected yet.

FIG. 4 shows another display region 400 as time has progressed and more data values have been collected. In the example of FIG. 4, the collection of data values has proceeded through time at 6:10 a.m., such that two additional time intervals (05 and 06) are depicted in display region 400. In FIG. 4, the remaining values of time interval 04 (that were not collected as of the time represented by the display region 300 of FIG. 3) have been collected, so that the blocks in time interval 04 in FIG. 4 are full blocks (rather than the partial blocks 306A, 308A of FIG. 3). However, in FIG. 4, the blocks in time interval 06 are partial blocks. The display region 400 has a denser arrangement of cells than the display region 300 since more data values are represented in FIG. 4.

Figure 5:
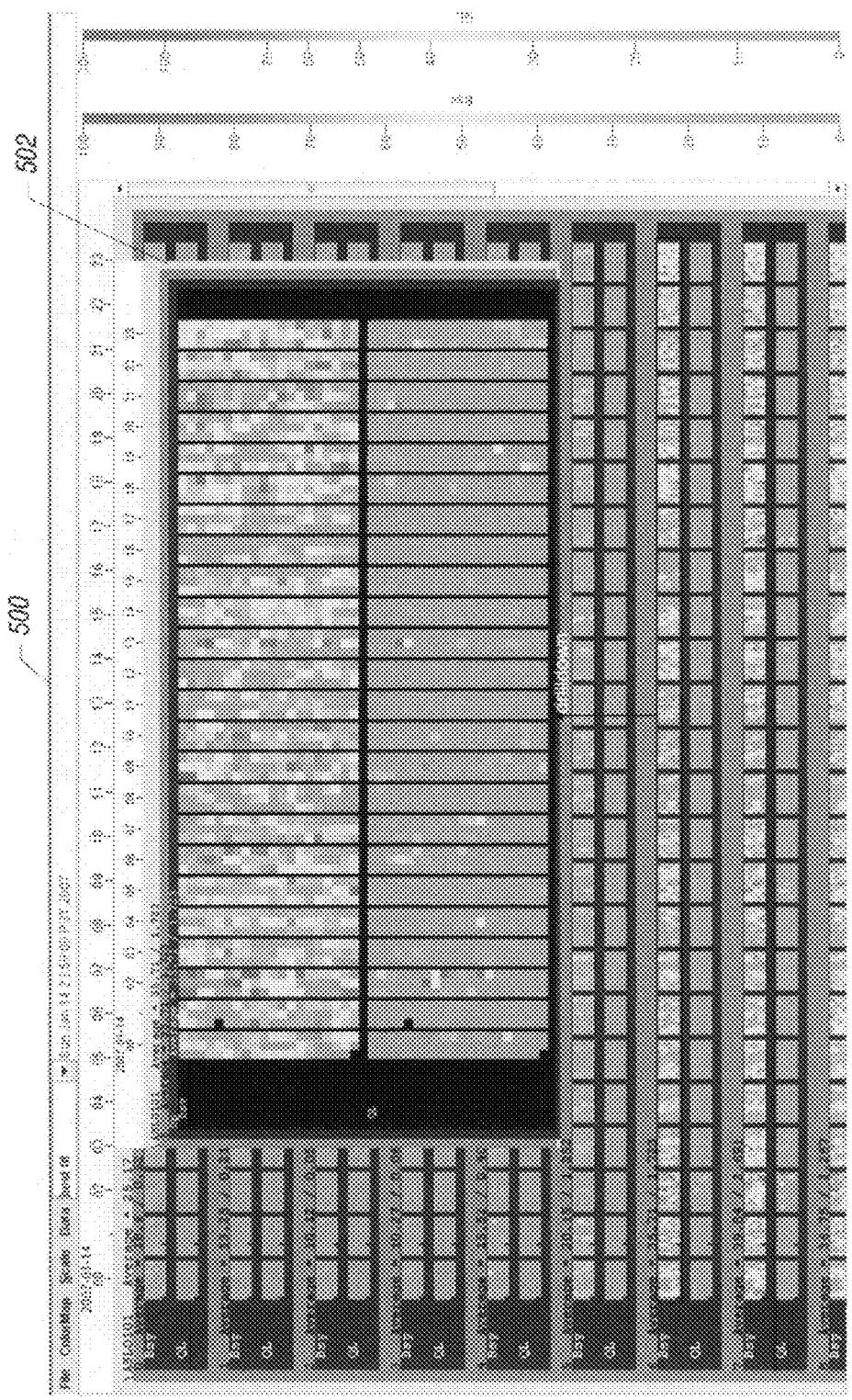

FIG. 5 illustrates a particular drill-down technique to visualize a particular row in greater detail. In the example of FIG. 5, 24 hourly time intervals are depicted in a display region 500 for eight full time series (for CPUs 0-7) and a part of a ninth time series (for CPU 8). If a user desires to more closely visualize the time series for CPU 6, for example, then the user can do a rubber-band operation by selecting the entire row for CPU 6 (by dragging a mouse pointer that covers the entire row for CPU 6) to cause a pop-up display region 502 to be presented. The pop-up display region 502 includes just the two sub-rows of blocks for data values of the two attributes (Bsy and QL) for CPU 6. This allows a user to more clearly see the measured data values associated with CPU 6. The user can alternatively drill down or zoom in on less than the entire row. For example, the user can perform a rubber-band operation to select one or more blocks to drill down into, in which case, a pop-up display region would show just the selected blocks for more detailed visualization.

Figure 6:
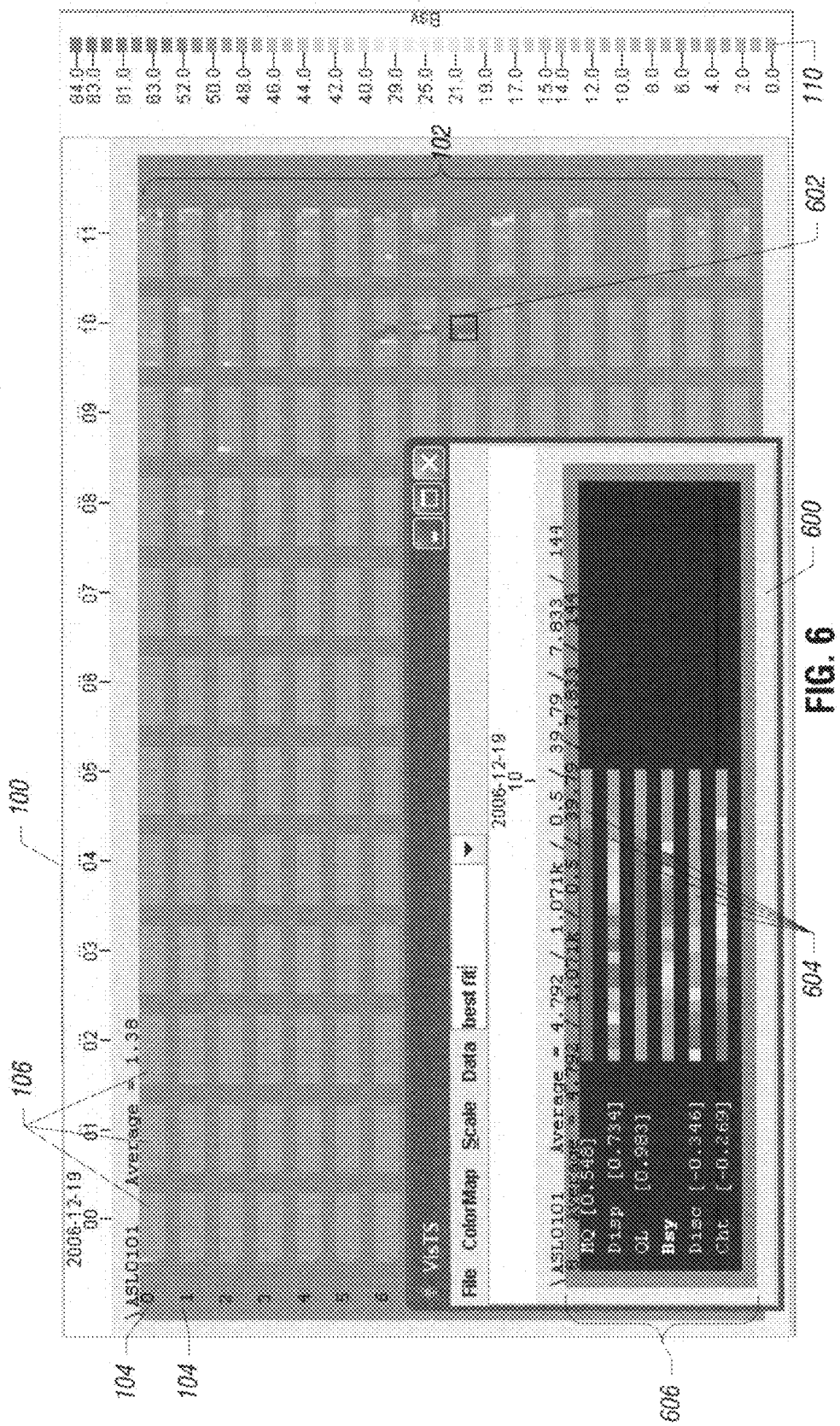

FIG. 6 shows the display region 100 of FIG. 1 except with a pop-up screen 600 to display additional data associated with a portion of interest, in this case, portion 602 having a collection of red cells that indicate relatively high CPU busy percentage values. The user can, for example, perform a rubber-band operation on portion 602, or alternatively, the user can simply click or double-click on the portion 602 of interest. In response to the user action, the pop-up screen 600 displays the values of several attributes, in addition to the Bsy attribute (all attributes indicated generally by 606 in FIG. 6). The values of the additional attributes are presented in corresponding cell-based lines 604 in an analysis window 606 in the pop-up display screen 600, where the cells of each cell-based line associated with a corresponding attribute are assigned colors based on the values of the corresponding attribute.

The analysis window 606 allows the user to see other attribute values around the same time frame in which the Bsy values have the relatively high values so that the user can better understand a root cause of the high CPU busy percentage values in the portion 602 of interest. In the example of FIG. 6, the analysis window 606 includes cell-based lines 604 for the Bsy (CPU busy percentage) attribute, the QL (queue length) attribute, and a Disp (job dispatch) attribute, among others. Note that, in the example, the Bsy attribute starts with green cells (indicating low CPU busy percentages), proceeds to yellow and red cells (indicating larger CPU busy percentages), and then falls back to green cells (indicating low CPU busy percentages). The QL attribute similarly starts out with green cells, transitions to red cells in the middle part, and then transitions back to green cells, indicating that the queue length has increased in the middle part. A user can thus determine from the content of the analysis window 606 that there is a high correlation between queue length and the CPU busy percentage attributes. In other words, heavy loading of the CPU is likely caused by higher queue lengths.

Note also that in the analysis window 606, the Disp attribute starts with a collection of orange, yellow, and green cells, transitions to a collection of red, orange, and yellow cells, and then transitions back to green cells. This indicates that there is also some correlation (albeit weaker) between the Disp attribute and the Bsy attribute (in other words, dispatch of a larger number of jobs results in heavier loading of the CPU).

Figure 7:
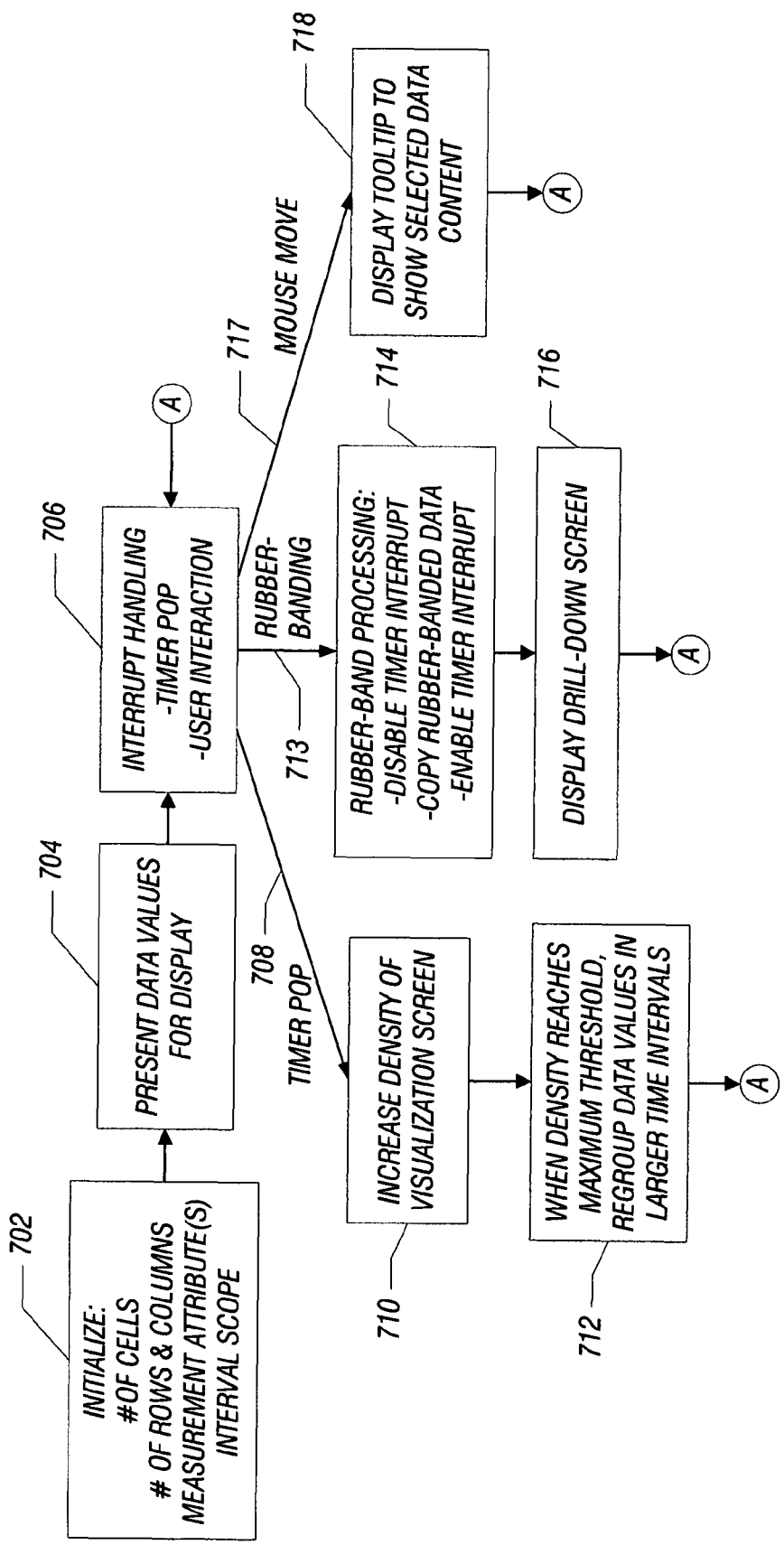
FIG. 7 is a flow diagram of a visualization process according to an embodiment.

FIG. 7 shows a flow diagram of a visualization process according to some embodiments. The visualization process can be performed by visualization software executable in a computer, according to one implementation. In an initialize task 702, various aspects of the visualization screen can be defined, including the number of cells in each block corresponding to a particular main time interval of the main array, the number of rows and columns in each block, measurement attribute(s) to be displayed, interval scope (the main time intervals), and other aspects. The initialization can be based on various user inputs, which can be received through a GUI control screen or through some other mechanism. For example, the user can be presented with various fields in which the user can enter control values corresponding to the visualization screen. Alternatively, pull-down menus can be provided in the GUI control screen to allow a user to select the arrangement of the visualization screen.

Once the initialize task 702 has been performed, then data values of the selected measurement attribute(s) are presented (at 704) for display, either on a local display device or a remote local display device, in a visualization screen.

Next, control passes to an interrupt handling task 706 performed by an interrupt handler, where the interrupt handler is able to detect for time interrupts or user interaction interrupts. A time interrupt is an interrupt generated every periodic interval, such as every minute (assuming that measurement data values for the attribute being monitored are sampled every minute). For example, the time interrupt may be invoked by a timer popping (expiring). In alternative implementations, different periodic time intervals can be used to cause generation of time interrupts.

A user interaction interrupt refers to a user performing some action in a visualization screen, such as to perform a drill-down (e.g., a rubber-band operation, a mouse click, a mouse movement, and so forth).

In response to a time interrupt (708), the density of the visualization screen is increased (at 710) (since additional data values have to be displayed in the visualization screen). Note that at some point, display cells within the visualization screen can become so dense that it may be rendered unreadable. The visualization software is able to detect when the density of display cells has reached a maximum threshold. If the maximum density threshold is reached, then the data records of the cells are regrouped (at 712) into larger time intervals, such as from an hour interval to a quarter-of-day interval. When the regrouping occurs, the number of blocks that are presented in the visualization screen is reduced, since each time interval now corresponds to a quarter-of-day instead of to an hour. Also, within each block, the number of the cells is decreased, since each cell now would represent a larger time interval than the minute time interval assumed for earlier examples. If appropriate, when regrouping, aggregation can be performed on the data values of the grouped data records such that the new cells correspond to data values that are aggregates of data values for the prior cells. An aggregate can include one of a sum, maximum, minimum, median, average, and so forth.

Control then proceeds back to the interrupt handling task 706 to wait for the next interrupt. If the interrupt is a rubber-banding mouse action (713), then rubber-band processing (714) is performed. In the rubber-band processing, the timer interrupt is first disabled, after which the rubber-banded data values are copied for display in a pop-up screen (e.g., pop-up screen 502 of FIG. 5) that contains just the rubber-banded data values (and not the remaining data values of the main visualization screen). The timer interrupt is then enabled. Disabling the timer interrupt is performed prior to copying to avoid an update of the main visualization screen during the rubber-banding processing (714).

Next, a drill-down screen (pop-up screen) is displayed (at 716), where the drill-down screen contains the copied rubber-banded data, or the result of some data mining operation performed on the copied rubber-banded data. Data mining can refer to the application of some algorithm or mathematical operation on the rubber-banded data, or the retrieval of related or other attribute data for display in the drill-down screen to allow a user to better understand a particular situation associated with the copied rubber-banded data.

Control then returns to the interrupt handling task 706. If the received interrupt is a mouse move interrupt (717), then the action performed is to display (at 718) a tooltip display element (a pop-up display element) to show selected content of a portion of the visualization screen that a mouse pointer covers. For example, if the mouse pointer is moved over a particular block or cell, then information associated with the block or cell can be displayed in the tooltip display element.

Figure 8:
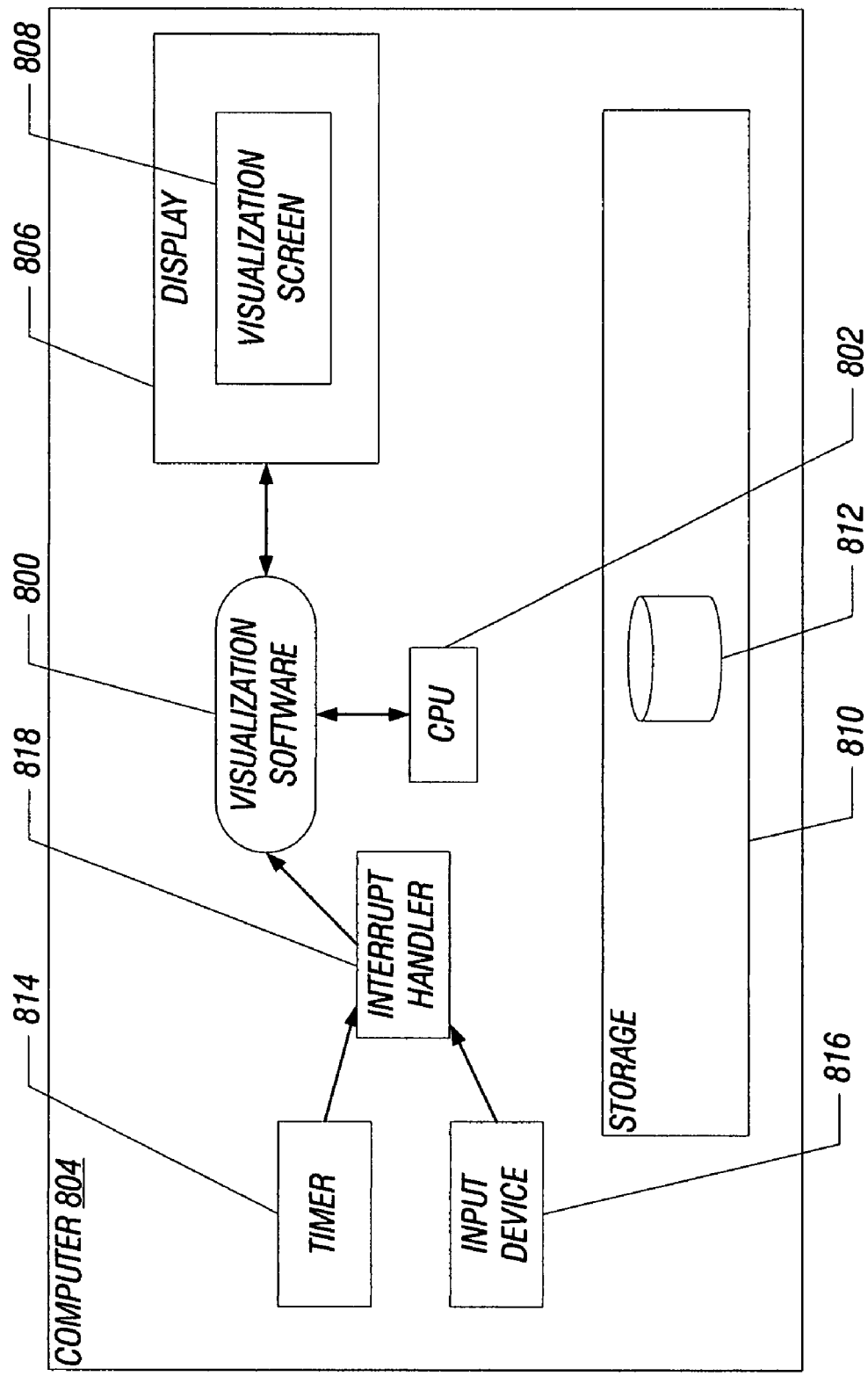
FIG. 8 is a block diagram of a computer in which software for performing a visualization process according to an embodiment is executable.

FIG. 8 depicts a computer 804 having visualization software 800 that can be used to perform various tasks discussed above. The visualization software 800 is executable on one or more central processing units (CPUs) 802 of the computer 804.

The computer 804 further includes an interrupt handler 818, which can also be software executable on the CPUs 802. The interrupt handler 818 receives either a timer interrupt 814 or an input device interrupt 816 to perform the tasks depicted in FIG. 7.

The computer 804 also includes a display device 806 that can display a visualization screen 808 associated with the visualization software 800. The computer 804 further includes a storage 810 for storing a database 812, where the database 812 can contain the data associated with various time series for visualization in the display device 806.

Note that although the display device 806 and database 812 are depicted as being part of the computer 804, the display device 806 and the database 812 can actually be remotely located from the computer 804 in other implementations. For example, the visualization software 800 can be executable on a server computer, whereas the actual visualization can be performed at a remote client computer. Also, the database 812 can be stored in yet another database server that is located somewhere in a network.

Thus, presenting visual indicators for respective data values to be displayed in the visualization screen includes presenting the visual indicators at a local display device (806) or at a remote display device, which can be located in another computer connected over a network.

Instructions of software described above (including visualization software 800 and interrupt handler 818 of FIG. 8) are loaded for execution on a processor (such as one or more CPUs 802 in FIG. 8). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of visualizing growing time series data, comprising:
presenting, by a computer for display in a single view, first data values of a time series, wherein the data values are for display in a first arrangement of cells arranged according to a first density in the view;
receiving, by the computer, additional data values of the time series in addition to the first data values;
modifying, by the computer, a density of the view in response to receiving the additional data values;
presenting, by the computer, the first data values and additional data values for display in a second arrangement of cells arranged according to the modified density in the view;
continually receiving further data values of the time series;
continually modifying the density of the view in response to continually receiving the further data values for displaying the first, additional, and further data values;
grouping data records represented by corresponding cells into larger time intervals in response to the view reaching a predetermined density threshold; and
aggregating corresponding data values of the grouped data records.

2. The method of claim 1, further comprising:
receiving an indication of user selection of a portion of the view; and
in response to the indication of user selection, displaying an analysis window to depict information associated with the selected portion of the view.

3. The method of claim 2, wherein the first and additional data values are data values of a first attribute, and wherein displaying the information in the analysis window comprises displaying data values of at least another attribute in the analysis window.

4. The method of claim 3, wherein displaying the data values of the at least another attribute comprises displaying a time sequence of the data values of the at least another attribute.

5. The method of claim 1, wherein presenting the first and additional data values for display in the second arrangement of cells arranged according to the modified density comprises presenting the first and additional data values for display in a larger number of cells in the view than in the first arrangement.

6. The method of claim 1, further comprising maintaining a size of the view fixed when displaying the first data values according to the first density and when displaying the first and additional data values according to the modified density.

7. The method of claim 1, further comprising providing a first number of time intervals in the view to present the first data values, and providing a second, greater number of time intervals in the view to present the first and additional data values.

8. The method of claim 7, further comprising:
displaying the time intervals as columns in the view; and
arranging an array of blocks of cells in corresponding rows and columns of the view, wherein the blocks of cells for displaying the first data values according to the first density has a first size, and the blocks of cells for displaying the first and additional data values according to the second density has a second, smaller size.

9. The method of claim 8, further comprising displaying a sub-array of cells in each block, wherein each block represents a main time interval and each cell represents a sub-time interval.

10. The method of claim 1, wherein the cells in the first and second arrangements represent corresponding data records, the method further comprising displaying content of the data records as a pointer is moved to the cells.

11. The method of claim 1, further comprising selecting colors for the cells according to respective data values.

12. The method of claim 1, further comprising:
receiving a first interrupt in response to a time interval passing; and in response to the first interrupt, modify the density of cells in the view.

13. The method of claim 12, further comprising:
receiving a second interrupt in response to a user action; and
in response to the second interrupt, invoking a pop-up screen to display information.

14. A method of visualizing a time series containing measurement data collected by a monitoring system, comprising:
receiving the measurement data over time;
presenting, for display in a view, the measurement data in an arrangement of cells to represent the time series;
assigning, by a computer, visual indicators to the cells according to values of the measurement data;
modifying, by the computer, a density of the arrangement of cells in the view with a growing amount of the measurement data, wherein the growing amount of the measurement data is displayable in the view without use of scrolling along a time axis of the view;
grouping data records represented by corresponding cells into larger time intervals in response to the view reaching a predetermined density threshold; and
aggregating corresponding data values of the grouped data records.

15. The method of claim 14, wherein presenting for display the measurement data in the arrangement of cells comprises presenting for display the measurement data in an array of blocks, wherein each block includes a sub-array of cells; and
wherein assigning the visual indicators to the cells according to the values of the measurement data comprises assigning colors to the cells according to the values of the measurement data.

16. The method of claim 14, wherein presenting for display the measurement data in the arrangement of cells comprises presenting for display the measurement data in an arrangement of a first number of cells prior to modifying the density, wherein the method further comprises:
presenting, for display, the measurement data in an arrangement of a second number of the cells after modifying the density.

17. The method of claim 14, wherein the view contains a first number of blocks of the cells prior to the grouping, and wherein after the grouping the view contains a second, smaller number of blocks of the cells.

18. Instructions on a computer-usable storage medium that when executed cause a computer to:
present, for display in a view, first data values of a time series, wherein the data values are for display in cells arranged according to a first density in the view;
receive additional data values of the time series in addition to the first data values;
modify a density of the view in response to receiving the additional data values;
present the first data values and additional data values for display in cells arranged according to the modified density in the view, wherein the first and additional data values are displayable in the view without use of scrolling along a time axis of the view;
group data records represented by corresponding cells into larger time intervals in response to the view reaching a predetermined density threshold; and
aggregate corresponding data values of the grouped data records.

19. The instructions of claim 18, wherein the view contains a first number of blocks of the cells prior to the grouping, and wherein after the grouping the view contains a second, smaller number of blocks of the cells.

* * * * *